United States Patent [19]

Kristensen

[11] Patent Number: 4,731,932
[45] Date of Patent: Mar. 22, 1988

[54] METHOD AND MEASURING SYSTEM FOR PREPARING WORKING GAUGES

[76] Inventor: Gerhard Kristensen, Gylden 88, Fynshav, 6440 Augustenborg, Denmark

[21] Appl. No.: 890,771
[22] PCT Filed: Nov. 5, 1985
[86] PCT No.: PCT/DK85/00104
§ 371 Date: Jul. 7, 1986
§ 102(e) Date: Jul. 7, 1986
[87] PCT Pub. No.: WO86/02993
PCT Pub. Date: May 22, 1986

[30] Foreign Application Priority Data
Nov. 6, 1984 [DK] Denmark .............................. 5264/84

[51] Int. Cl.⁴ ................................................ G01B 3/46
[52] U.S. Cl. ...................................... 33/168 B; 33/170
[58] Field of Search ............. 33/169 R, 168 B, 168 R, 33/DIG. 18, 567, 170 R, 170 B, 164 C

[56] References Cited

U.S. PATENT DOCUMENTS

| 495,019 | 4/1893 | Carter et al. | 33/164 C |
| 2,345,591 | 4/1944 | Frederick | 33/164 C |
| 4,219,934 | 9/1980 | Davitt | 33/168 B |

Primary Examiner—Harry N. Haroian
Attorney, Agent, or Firm—Antonelli, Terry Wands

[57] ABSTRACT

In order to enable extremely accurate length dimensions of working gauges, a method and measuring system is provided which includes both special standard gauge blocks and special working gauge members, as well as an associated specialized measuring device by which a working gauge may be produced through a simple length adjustment of two mutually fixable displaceable elements. The adjustment is effected in the measuring device by comparison with the dimension of a pre-measured standard gauge block. The gauge blocks and working gauges may be similarly shaped and include, for example, a cylindrical body and a measurement defining pin projecting therefrom, thereby resulting in an inexpensive manufacturing of the gauge blocks and an easy adjustability of the working gauges.

9 Claims, 7 Drawing Figures

METHOD AND MEASURING SYSTEM FOR PREPARING WORKING GAUGES

BACKGROUND OF THE INVENTION

The present invention relates to a measuring system for preparing working gauges with a measurement precision of 1 μm.

A working gauge, also called a master, is an e.g. block shaped body, which is machined to show a desired exact distance between two surface areas, whereby it is usable as a comparison gauge in connection with high precision working of various production parts. When the gauge has a correct measurement, it will be sufficient to carry out a comparative measuring of the production part, e.g. with the use of a stand having a sufficiently accurate dial gauge. Often it is necessary, e.g. during a day of production, to carry out several measurings of the gauge for a steady checking up of the other measuring equipment, and this implies a certain wear of the gauge, even if it is made of hard steel. Therefore, all according to the frequency of use and other conditions of use, the gauge block should be checked up from time to time by an exact and absolute measuring, which requires an expensive measuring apparatus. In large enterprises having such an apparatus, e.g. a three-coordinate measuring machine, there are often queues before the respective measuring departments, and the single measurings are time-consuming.

If or when the absolute measurement of a gauge has changed, the gauge may still be fully usable, at least by small deviations, when it is marked—preferably by engraving—with an indication of its deviation from its nominal measurement, e.g. "−4 μm". In use it is hereby possible to effect the required corrections by an exact dial gauge or a similar device which, without being too costly, can accurately measure inside a narrow measuring range of e.g. 10 mm, while the total measuring range employed may be up to some 20–50 cm. It has been found, however, that the users nevertheless sometimes forget to carry out the required corrections, and as well known this may give rise to an expensive waste or to serious machinery break downs later on.

Instead of spending time on preparing a master gauge with associated absolute control measurings during the preparation thereof, it may be chosen to assemble a master gauge from standard calibrated gauge blocks, which should need no control measuring. However, these blocks are quite expensive, and it has been found that the blocks are not as accurate as commonly believed. In this connection, the heat from manual handling of a short duration may be sufficient to cause a change of several μms, and moreover even these blocks will be worn if they are used as practical measuring implements and not only as adjustment standards in protected surroundings in specialized laboratories, so-called measuring rooms. Worn blocks may well be calibrated, but only at very high costs and with a long waiting time, since the production and the calibration of gauge blocks is a specialty practiced by only very few manufacurers.

In this connection, it should be mentioned that accurate length measurement standards for industrial use are found almost exclusively as the gauge blocks, which may be placed together to form any measurement of addition under controlled circumstances, e.g. by a room temperature of 20° C. Otherwise the users have to provide their own gauges or masters based on the use of accurate measuring instruments, which should of course also work under controlled conditions. The standard blocks are provided with entirely smooth and exactly plan parallel surfaces which by disposing the blocks together may cause the blocks to stick together already by the associated complete displacement of air.

From a measuring technical point of view, it is very important that the opposed surfaces are really completely plan parallel, as a measurement difference of e.g. one half of one thousandth of a millimeter between the opposite ends of the blocks might increase by the laying together of five-six blocks. Also, the possible high accuracy of inexpensive short distance measuring instruments such as dial gauges and micrometer screws normally is conditioned by these instruments co-acting with a surface which is exactly perpendicular to the moving direction of the actuator pin of the instrument, as the actuator pin could otherwise be subjected to disturbing lateral force components.

With the use of standard gauge blocks, it is possible to build up a master gauge having exactly the required measurement (a so-called zero master), as well as to build up a master gauge having the required measurement only approximately, whereafter the final measurement may be determined with the additional use of an exact short distance measuring device. However, the gauge blocks should still be checked by a control measuring from time to time, as an operator could otherwise, in practice, carry on producing faulty objects with full confidence of the required tolerances being observed, even when given correction values are duly taken into account.

It is the purpose of the invention to provide a measuring element system which may widely simplify and ensure the manufacturing of articles with correct length measurements of high precision.

According to the invention, for the provision of a working gauge or master use is made of one or more length variable and fixable master units, which, in a measuring apparatus and not under laboratory conditions, are adjusted and fixed at a length dimension corresponding to the length of a calibrated gauge as measured in the same or a corresponding measuring apparatus, whereby the calibrated gauge includes laid together, conventional gauge blocks. The measuring apparatus includes an accurate short distance measuring device such as a dial gauge, which enables a measuring out with the required high accuracy over a short distance of e.g. 20–30 mm. By this construction, it is possible to build up all possible master dimensions based on a rather small number of precalibrated gauges, and the master itself may correspondingly include a small number of standard units. As the length dimension of the master unit is adjustable, it is possible to check and correct the master by way of a simple adjustment with the use of the measuring apparatus and the calibrated gauge. Thus, if a check reveals a changed dimension of the master, the correct dimension may be rapidly and easily reestablished, such that, with the use of the master, it will not be necessary to calculate with measurement corrections, i.e. the master will steadily be a "zero master", whereby the risk of tolerance errors of the produced articles is considerably reduced.

To all this it is of course of utmost importance or a superior condition that the adjustable master units be practically suitable and dimensionally stable, and it is also important that the precalibrated gauge blocks should be relatively inexpensive and dimensionally stable.

A significant feature of the present invention is that the invention provides for a new type of a "gauge block" which is adjustable and usable with high accuracy, and which is usable both for easily readjustable working gauges or masters and for preadjusted gauges for absolute measurements. An adjustable conventional gauge block can hardly be imagined, but in connection with the invention, it has been realized that for the relevant use of the calibrated gauges, there is no practical need of a block having broad and plan parallel surfaces, since it is perfectly possible and even advantageous to make use of a block member having but a single broad support surface and an opposite measuring surface which may have a very small area or even be almost point shaped; in both cases the measuring surface may consist of an end portion of a pin, which is fixably length displaceably received in a bore in a block member shaped with the broad support surface.

In, for example, U.S. Pat. No. 4,219,934, a measuring arrangement is proposed, which comprises the use of adjustable gauge elements and an associated measuring apparatus. These proposed gauge elements include a base block, in which there is provided a screw device, which is manually operable for adjusting a pin projecting from the base block. A clamp enables the pin to be fixed in some desired position, whereby the gauge measurement will be the distance between the free end of the pin and the opposed end surface of the base block. Such master elements with their associated threaded systems are very expensive to manufacture, and since the threaded systems occupy a considerable space in the direction of the gauge measurement, the elements have a rather large minimum thickness. Furthermore, the measuring apparatus used for the adjustment of the gauges in this proposed arrangement is unable to satisfy the tolerance requirements in the $\mu$m range, because the apparatus largely corresponds to a usual slide gauge with a nonius system, which is entirely insufficient. Thus, the proposed arrangement will not in any way obviate the use of the gauge blocks, when really precise measurings or adjustments are to be made, and the proposed construction is rather one of many examples of the unlucky fact that the operators may well consider extremely small relative measurement variations in the outermost end of the measuring system, yet without any correspondingly accurate reference to the absolute measurement. In practice just this circumstance is responsible for many machine break downs, even though a mechanic has conscientiously observed the actual tolerance requirements based on a working gauge, the measurement of which may deviate considerably from the desired absolute measurement.

According to the invention, the block member is preferably a circular cylindrical body, in which the pin is received with slide fit in a central axial bore, with the pin being fixable by a radial clamp screw in the cylindrical body. This block design is well usable both for adjustable masters and for fixed gauges for absolute measurements, where the latter are calibrated by existing high precision gauges or highly precise measuring machines. The calibration may be effected by displacement and fixation of the pin, i.e. without machining the material, whereby a high calibration precision is obtainable in a simple and inexpensive with the outer end of the pin being preshaped with a desired hardness and shape. The gauges for absolute measurements are produceable at essentially reduced costs compared with the conventional gauge blocks.

The general applicability of these novel standard gauges may, possibly, be somewhat limited compared with the conventional gauge blocks, but what is here in focus is the use of precise gauges as a reference for following measurings in the measuring apparatus for working gauges, and in this particular relation the standard gauges of the invention will be not only less expensive, but improved as compared with the conventional blocks. The circular base surface of the block members, preferably constituted by an outermost annular area at the bottom side of the block member, will, when reasonably dimensioned, e.g. with an outer diameter of 5 cm, provide for a measuring-technically better rest against a carrier surface as compared with a side of a conventional gauge block which corresponds approximately to a narrow side of a small match box; the ring circular support surface will, principally, be uniformly three-point-supported no matter how it is turned, which does not apply to a rectangular surface.

Moreover, the gauges according to the invention will show the advantage that compared with conventional gauge blocks, they are less liable to undergo measurement changes resulting from short temperature changes of the outer surface thereof, e.g. when being manually touched, since the central pin is to some degree heat insulated from the surrounding block body.

A further significant feature of the invention is that the measuring apparatus is designed to be able to measure the axial height of a central pin of a calibrated standard gauge and an adjustable working gauge, respectively, of the type provided by the invention, since it is hereby possible to obtain well defined measurings with the aid of a short distance measuring instrument of a type operating directly in or symmetrically about the associated measuring axis, i.e. without the measuring itself (as with a slide gauge) taking place in a line offset from the real measuring line with associated uncertainty factors.

For carrying out the desired adjustment of the gauge according to the invention it is an obvious problem that it is difficult to effect a direct pin displacement with an accuracy of the magnitude 1 $\mu$m, and it is important, therefore, that the measuring apparatus according to the invention, as well as the employed masters or working gauge units, are designed such that the measuring apparatus has an operation section including an actuator rod, which is operable, through a gear coupling, to carry out a slow displacement which is transferred to the central pin of the master unit, whereby this pin is easily adjusted and then fixable with the desired very high precision.

In connection with the invention, it is a special problem that the temporarily fixed pin of the master unit should be fixed sufficiently hard to make sure that it will not be displaced as much as a single $\mu$m in response to forces applied from the outside. This, of course, is achievable by a very hard clamping of the pin, but it has proved difficult to indicate some standard for such a "sufficiently hard clamping", whereas the clamping action itself may well give rise to a length increase of the pin. As disclosed in more detail below the invention, therefore, comprises a special clamping system, whereby it is achieved that the central pin will either not at all be clamped or will be fully clamped with a sufficient stability of measurement, such that the operator can easily decide whether the clamping is effective or not.

BRIEF DESCRIPTION OF THE DRAWINGS

In the following the invention is described in more detail with reference to the accompanying drawing.

DETAILED DESCRIPTION

Figure 1:
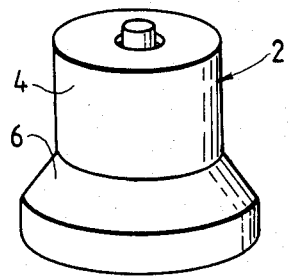
FIG. 1 is a perspective view of a gauge unit according to the invention.
Figure 2:
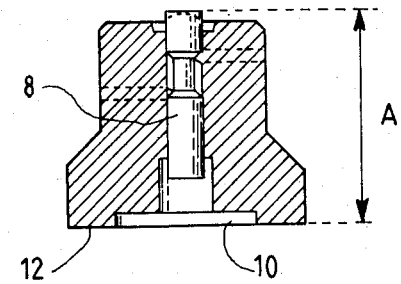
FIG. 2 is a cross-sectional view of the gauge unit of FIG. 1.

In FIGS. 1 and 2 is shown a gauge unit 2 including a cylindrical body 4 having a widened bottom portion 6 and a central bore, in which a pin 8 is received and fixed so as to project slightly above the top side of the body 4. The pin 8 may be fixed by a radial clamping screw, but another and different fixing manner is disclosed below. In the bottom surface of the body 4,6 a central recess 10 is provided, leaving the body with an outer annular bottom surface 12. This bottom surface 12 is polished to a high precision, just as the central bore is provided exactly perpendicularly to the plane of the outer ring annular or ring surface 12. The upper end of the pin 8 is shaped planar and plane parallel with the annular bottom surface 12 with high precision, or it may be dome shaped as shown in dotted lines.

The low end of the pin 8 is accessible from below, through the recess 10, and the pin upon the insertion thereof, has been displaced upwardly until it has been ascertained, by high precision measuring equipment, that the distance between the upper end of the pin and the ring surface 12 is exactly as desired, e.g. 50,000 mm at a temperature of 20° C. Thereafter the pin has been arrested to the body 4 without having changed its length indication, and the gauge unit or block 2 is then ready, as a finished product, to be shipped to the user, alone or together with other units as described below. However, these precalibrated gauge units 2 should be produced in some different sizes, viz. in successive sizes with intervals of e.g. 25 mm. To this end a pin 8 could project to some 25 mm from a block 4, which could also be used for a gauge unit of 50 mm. It is preferred, however, that the pins project only slightly from the top of the gauge bodies 4 so as to be adapted to various sizes.

In the precalibrated gauge units, the pins 8 are fixed in a non-releasable manner, e.g. by an adhesive material.

Figure 3:
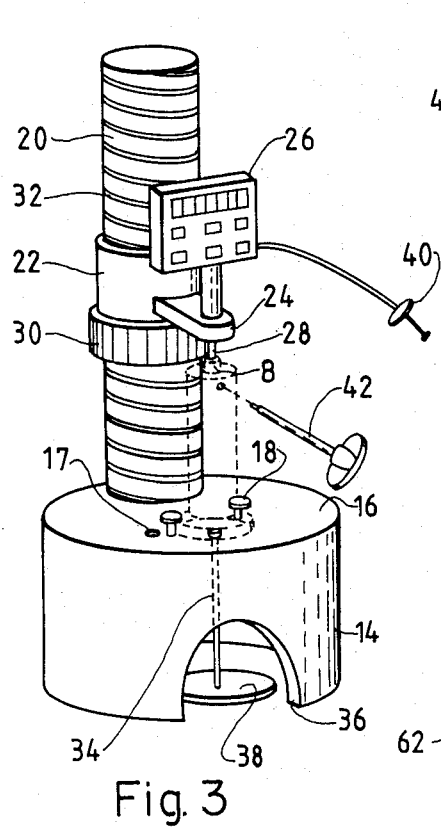
FIG. 3 is a perspective view of a measuring apparatus according to the invention.

The gauge units are intended for use as calibration units in a measuring apparatus as shown in FIG. 3. The measuring apparatus comprises a lower housing portion 14, the top side 16 of which constitutes a platform for receiving the gauge units as well as the working gauges described below. On the platform 16 is mounted a pair of clamp screws 18 for clamping the foot portion 6 of such a unit to the platform. At the rear of the platform 16 is arranged an upstanding pillar 20 carrying a sleeve member 22, which has a forwardly projecting carrier bracket 24 for a measuring instrument 26 having a depending actuator pin 28. In a manner not shown the sleeve 22 engages with an axial groove extending along the rear side of the pillar 20, such that the sleeve is height adjustable on the pillar, but not rotatable thereon. Underneath the sleeve 22 is provided a carrier nut 30 cooperating with a threading 32 on the pillar 20, such that the sleeve 22 and therewith the measuring instrument 26 may be height adjusted along the pillar 20 by the nut 30.

Underneath the central area of a gauge unit 2 as placed on the platform 16 in a centered position relative to the clamp screws 18, the platform is provided with a threaded hole, in which a spindle rod 34 is received. The spindle 34 projects downwardly inside the housing 14 and is accessible through a side opening 36 for being rotated by a lower hand wheel 38.

With the upper end of the spindle 34 located in a retracted position, a gauge unit 2 may be placed on the platform 16 supported and centered by the clamp screws 18, which clamp the foot portion 6 against the platform. The displaceable unit 22,26 may be adjusted, by the nut 30, into a position, in which the top of the pin 8 of the gauge unit urges the actuator pin 28 a distance upwardly. The reading of the instrument 26 will now accurately indicate the distance between the top side of the platform 16 and the lower end of the actuator pin 28. This measurement will be the measurement of the gauge unit plus the showing of the measuring instrument 26.

In every measuring instrument there is a certain hysteresis function, whereby the measuring results may be different depending on the actuator pin having been moved into its final position towards or away from the instrument, and it is already an established standard that the correct reading is obtained by the actuator pin being moved forwardly against the object to be measured. The instrument 26 in FIG. 3, therefore, is in a known manner provided with an actuator handle 40, which is operable to effect retraction and a following lowering of the pin 28, such that the correct measuring value will be readable upon operation of the handle.

Thereafter the handle 40 is actuated for lifting the pin 28, and the gauge unit is released and removed from the platform 16.

The size of the applied gauge unit 2 is chosen so as to roughly correspond to the desired measurement of a working gauge to be produced. By way of example, it may be desired to produce a working gauge or master with a length of 56,500 mm with a tolerance of ±2 μm; here a precalibrated gauge unit of 50 mm is mounted in the measuring apparatus so as to produce a meter reading e.g. somewhere between 100 and 8000 μm. The reading may be 2134 μm, whereby the correct reading of the master shall be 2,134+(56.6−50.0)=8,634 mm±2 μm.

The master may be produced fully conventionally and be control measured in the apparatus shown in FIG. 3, but with the invention there is provided for special master elements, which are adjustable into a desired measurement in an easy and rapid manner. These master elements are similar to the gauge units 2, but their pins 8 are not prefixed, as they are adapted to be adjusted and releasably clamp arrested out the user's place (not even necessarily under laboratory conditions), such that the master elements are usable as working masters, which may later on be readjusted to other measurements or be afteradjusted for maintaining the desired measurement.

Figure 4:
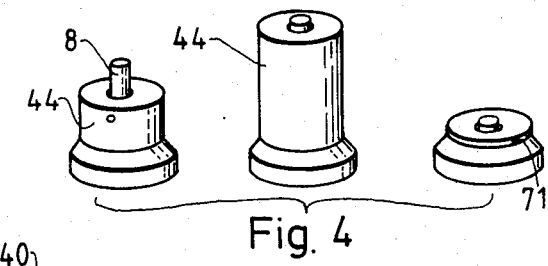
FIG. 4 is a perspective view of three different gauge units.

FIG. 4 illustrates three masters 44 of different lengths. A selected one of these, corresponding at the best to the size of the previously measured out gauge unit 2, is mounted in the apparatus of FIG. 3, and by the hand wheel 38 the actuator spindle 34 is then displaced upwardly such that it will push the central pin 8 of the master unit 44 upwardly until the desired meter reading is obtained, e.g. 8,635 mm according to the above example. Thereafter, the handle 40 is operated to raise and lower the actuator pin 28 for a more accurate indication of the measurement, and the required adjustments are effected until the correct measurement is obtained. Thereafter, the pin 8 is fixed by a radial clamp screw in the cylindrical body of the master, the screw being operated by a screw driver 42, and it is checked that the measurement hereby remains correct.

The pin 8 of the master may well project several millimeters or even centimeters above the top of the master body; this is permissible because the master should be used locally only and is to be checked and readjusted at intervals.

Figure 5:
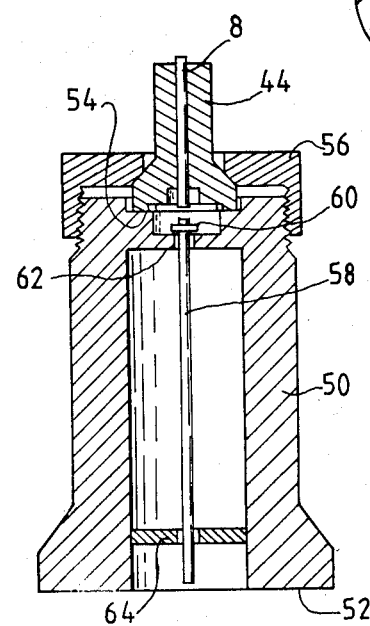
FIG. 5 is a sectional view of a modified embodiment of a gauge unit.

For the provision of very long gauge units and masters, it is possible to use the already described units in connection with special base units as illustrated in FIG. 5. Such a unit comprises a tube member 50 of some selected length, having bottomwise a polished end surface 52 and a widened foot portion 53, while at the top it has a support surface 54 for receiving a gauge unit 2 or a master 44, which is secured by means of a union nut 56. In case of a gauge unit, the assembly will be adjusted and fixed in a special laboratory, and the union nut 56 will be fastened unremovably, e.g. by an adhesive material.

For use in connection with masters 44, the base unit or extension socket 50 is provided with a central rod 58, the upper end of which carries an O-ring 60, by which the rod is hanging on an upper ledge 62, while at its lower end it passes through a central guiding member 64. The assembled unit 50,44 is mountable on the platform 16 of the measuring apparatus, whereby the clamp screws 18 should be moved to other respective screw holes 17 further spaced from the spindle 34, such that the wide foot portion 53 will be centered over the spindle 34. Thereafter, the master can be adjusted in the same manner as a master without extension socket, as the rod 58 will transfer the displacement of the spindle 34 to the pin 8 in the master.

It will be appreciated that it is possible to cover a rather large measuring range with the use of relatively few sizes of extension sockets 50 and masters 44, respectively, and the same applies to the corresponding precalibrated gauge units.

The gauge units 2 may be provided with a registration number, e.g. on a sheet label secured in the bottom recess 10 or on the tube member 50, and with a marking of their nominal measurement, e.g. "50 mm". The latter marking may occur on an annular disc on the top of the gauge body 4, and it may here also be indicated whether there is some deviation from the nominal measurement, e.g. after calibration, such as "−0.004". Such a deviation, of course, should be taken into account by the adjustment and the use of the measuring apparatus. Some measuring instruments 26 are able to be set or reset at zero, by any reading thereof, and it will be natural to effect such a resetting once contact has been established between the gauge and the actuator pin 24 of the instrument, inasfar as the associated reading per se will be of no interest. A marked deviation, if any, of the gauge measurement, may be read into the measuring instrument.

Figure 6:
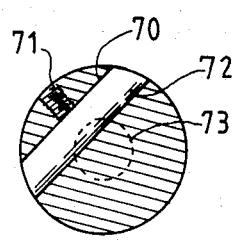
FIG. 6 is a cross-sectional top view of a gauge unit.

During the development of the invention, it became apparent that the releasable fixation of the master pins 8 by a clamp screw may cause measuring-technical problems, already because the border between an insufficiently stable fastening of the pins and an exaggerated clamping thereof is rather fluid. It has been endeavored to solve this problem in different ways, generally without success, but a single solution as here illustrated in FIG. 6 has proved to be surprisingly effective:

Prior to the drilling of the central bore in the block body 4, a cross hole 70 is drilled through the body somewhat outside the central axis thereof, and a radial hole 71 is drilled in the same cross plane as the hole 70. The hole 71 is screw threaded for receiving the clamp screw. The hole 70 is filled out by a steel pin 72 with tight fit. Only thereafter the central bore 73 is worked out, as shown so as to cut into the side of the filler pin 72.

When hereafter the pin 8 is placed in the central bore 73 and the clamp screw in the hole 71 is tightened against the outside of the filler pin 72, the clamping pressure from the screw will be transferred to the pin 8 through the remaining part of the filler pin 72, and during or by the tightening, it occurs as a peculiarity that the pin 8 very abruptly changes from being entirely loose to being simply immovably fixed. This change takes place by a very small increase of the tightening, i.e. the pin 8 as originally entirely loose needs no particularly strong clamping force in order to be fully stabilized. These circumstances and certain possible conditions for the achievement of the special effect have not so far been explainable or clarified.

For a fine adjustment of the pin 8, it is possible make use of an arrangement as indicated in FIG. 2, where the pin has a cylindrical recess, the opposite ends of which may cooperate with a pair of radial pin screws in the body 4, such that these two screws by selective tightening may drive the pin one way or the other until a correct location is arrived at. The pin may then be fixed as described above, with the use of a clamp screw and/or an adhesive material, i.e. this applies to a gauge unit of the precalibrated type.

Figure 7:
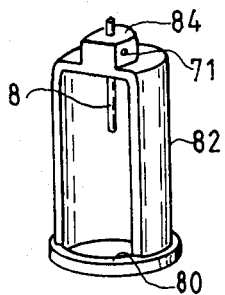
FIG. 7 is a perspective view of another embodiment of a gauge according to the invention.

The invention is not limited to the use of the principally simple rod shaped gauge units and working gauges, inasfar as the consequent use of pins as both rigid and adjustable distance elements involves advantages which may be utilized also in connection with otherwise shaped gauges and masters. Thus, a "depth master" may be designed as shown in FIG. 7, having a lower ring portion 80 with a polished bottom surface and an upstanding carrier cylinder 82, which is open at one side and carries a top portion 84, in which a pin is received so as to be height adjustable and then fixable by means of a clamp screw 71. In this embodiment, it is primarily the lower end of the pin which constitutes a distance element in conjunction with the bottom surface of the lower ring portion. The pin may be adjusted with the use of a master 44 previously prepared in the measuring apparatus and positioned inside the lower ring portion 80.

It has been mentioned that the elements of the present system include steel and that the gauge units are adjusted to correct absolute measurements at 20° C. The steel will undergo length variations of changing temperatures, but so will the articles under production, whereby it is unimportant whether the system and the masters are used generally at higher or lower temperatures. It is important, however, that the elements of the system, i.e. both the precalibrated gauge units, the measuring apparatus, and the working masters all be made of a material having preferably exactly the same coefficient of thermal expansion as the material of the articles under production, as the desired high accuracy will otherwise be achievable only when both the preparation and the use of the masters, here including even the article production, takes place at 20° C.

What is claimed is:

1. A method of preparing working gauges having a precision of 1 μm using at least one gauge unit and a measuring device for enabling a comparative measuring of said at least one gauge unit and said working gauge during said preparation thereof, the method comprising:
   providing said working gauge including a longitudinally displaceable element;
   displacing said displaceable element by said comparative measuring into a position projecting from said working gauge such that a distance measurement between one end of said working gauge and a free end of said projecting displaceable element corresponds to a predetermined desired master measure; and
   fixing said displaceable elemet to said working gauge.

2. A system for the preparation of working gauges with a precision of 1 μm, the system comprising:
   at least one gauge unit;
   a measuring device for comparative measuring of said gauge unit and said working gauge during said preparation thereof;
   a platform means for carrying the at least one gauge unit;
   means for adjusting a spacing between said platform means and an actuator member of a short distance measuring instrument;
   working gauges of different sizes, each of said working gauges including a displaceable element which is fixedly displaceable in a longitudinal direction, said working gauges being adapted to be individually inserted in said measuring device replacing said at least one gauge unit in such a manner that said displaceable element is adjustable to assume a position projecting from said inserted working gauge so as to define a desired master length based on engagement with said actuator element of said associated measuring instrument; and
   means for releasably fixing said displaceable element to said inserted working gauge.

3. A system according to claim 2, wherein said displaceable element includes a pin member located in a passage in said working gauge, said passage extends through said working gauge, and where said platform means is provided with an adjustment pin displaceable by an associated actuator system, and is displaceable into said passage of said working gauge for displacement of said pin member therein, when said working gauge is placed on said platform means, said working gauge being provided with a fixing means for fixing said pin member by a substantially purely crosswise clamping thereof.

4. A system according to claim 3, wherein said working gauge includes a circular-cylindrical body having a widened foot portion and wherein said platform means is provided with fastening means for enabling a centered fastening of said foot portion.

5. A system according to claim 4, further comprising at least one prolongation element for said working gauge including a tube member having at one end a socket portion for receiving and rigidly holding said foot portion of said working gauge, and at an opposite end thereof a widened base portion, said tube member having a centrally disposed, displaceably held pin body operable from said base portion of said tube member to effect an adjustment displacement of said pin member of an associated working gauge.

6. A system according to claim 4, wherein said foot portion of said working gauge has an internal recess with a diameter larger than a diameter of said passage, so that a support area of said foot portion is a relatively thin annular area along a circumferential portion of said foot portion.

7. A system according to claim 4, wherein said at least one gauge unit is constructed in the same manner as said working gauges but include permanently fixed pin members.

8. A system according to claim 4, wherein said platform means is fixed and said measuring device further comprises a column projecting upwardly from said platform means, said column holding a displaceable holder for said short distance measuring instrument, and wherein said actuator member is located coaxially with said adjustment pin of said platform means.

9. A system according to claim 3, wherein said fixing means comprises:
   a filler pin member tightly engaged in a cross hole provided through said working gauge so as to be offset from a central axis of said working gauge, said cross hole running substantially transversely to said passage and overlapping a portion of said passage; and
   a radial clamp screw embedded in said working gauge such that an inner end portion of said radial clamp screw contacts said filler pin member.

* * * * *